United States Patent [19]

Hodgson et al.

[11] Patent Number: 5,866,898
[45] Date of Patent: Feb. 2, 1999

[54] TIME DOMAIN MULTIPLEXED AMPLIFIED SENSOR ARRAY WITH IMPROVED SIGNAL TO NOISE RATIOS

[75] Inventors: Craig W. Hodgson, Thousand Oaks, Calif.; Jefferson L. Wagener, Aberdeen, Wash.; Michel J.F. Digonnet, Palo Alto, Calif.; H. John Shaw, Stanford, Calif.

[73] Assignee: The Board of Trustees of the LeLand Stanford Junior University, Stanford, Calif.

[21] Appl. No.: 814,548

[22] Filed: Mar. 11, 1997

Related U.S. Application Data

[60] Provisional application No. 60/021,699, Jul. 12, 1996 and provisional application No. 60/034,804, Jan. 2, 1997 and provisional application No. 60/036,114 Jan. 17, 1997.

[51] Int. Cl.$^6$ ...................................................... H01J 5/16
[52] U.S. Cl. ................................ 250/227.14; 250/227.19; 356/345
[58] Field of Search .......................... 250/227.14, 227.17, 250/227.18, 227.19, 227.23, 227.27; 356/345; 385/12, 10, 28, 32

[56] References Cited

U.S. PATENT DOCUMENTS

| 4,768,850 | 9/1988 | Moslehi et al. ............................ 385/15 |
| 5,173,743 | 12/1992 | Kim ................................... 250/227.19 |

OTHER PUBLICATIONS

Review of Interferometric Optical Fibre Hydrophone Technology, P. Nash. *IEE Proceedings—Radar, Sonar and Navigation*, vol. 143, Jun. 1996, pp. 204–209.

A Review of Recent Developments in Fiber Optic Sensor Technology, Alan D. Kersey, *Optical Fiber Technology*, vol. 2, Jul. 1996, pp. 291–317.

64–Element Time–Division Multiplexed Interferometric Sensor Array with EDFA Telemetry, A.D. Kersey, et al., *OFC '96*, vol. 2, 1996, OSA Technicl Digest Series, paper ThP5, Jan. 1966, pp. 270–271.

Time–Domain Addressing of Remote Fiber–Optic Interferometric Sensor Arrays, J.L. Brooks, et al., *Journal of Lightwave Technology*, vol. LT–5, Jul. 1987, pp. 1014–1023.

Cayman–Jamaica Fiber System: The Longest 2.5 Gbit/s Repeaterless Submarine Link Installed, E. Brandon, et al. *OFC '97*, vol. 6, 1997, OSA Technical Digest Series, paper TuL1, Jan. 1997.

(List continued on next page.)

*Primary Examiner*—Que T. Le
*Attorney, Agent, or Firm*—Knobbe, Martens, Olson & Bear, LLP

[57] ABSTRACT

The present invention significantly improves the signal to noise ratio (SNR) in a passive optical array by adding erbium-doped optical amplifiers between the sensor couplings to offset the coupler splitting losses. Optical amplifiers are inserted between the sensor couplings along the signal path, and the gain of the amplifiers is designed to offset losses due to the previous coupling. The overall SNR can be maintained without significant degradation even for large numbers of sensors. In a first aspect of the present invention, the amplifiers are located along the distribution and return buses directly after the couplers, except possibly for the last sensor. In a second aspect of the present invention, the amplifiers are located directly before the couplers. The optical amplifiers preferably are made of short lengths of erbium-doped fiber spliced into the distribution and return buses. Improvements can be made to the SNR when the distribution bus coupling ratios are set at optimal values. The value of the optimal coupling ratio depends upon the amplifier configuration, the excess loss and other configuration parameters. In alternative embodiments, sensors are grouped into parallel configurations along the distribution and return buses to increase the number of sensors without a corresponding increase in the number of amplifiers and with an improvement in system performance to a certain point.

18 Claims, 12 Drawing Sheets

AMPLIFIED SENSOR ARRAY
WITH 3 SENSORS PER SUB-ARRAY

OTHER PUBLICATIONS

Erbium–Doped Fiber Splicing and Splice Loss Estimation, Wenxin Zheng, et al., *Journal of Lightwave Technology*, vol. 12, Mar. 1994, 430–435.

Single–Mode Fiber Optics, Luc B. Jeunhomme, 2nd ed., Marcel Dekker, New York, 1990 p. 101, Jan. 1990.

High–Power 1.48 µm Cascaded Raman Laser in Germanosilicate Fibers, S.G. Grubb, et al., *Technical Digest Optical Amplifiers and Their Applications*, 1995, pp. 197–199, Paper SaA4, Davos, Switzerland, Jan. 1995.

Fiber–Optic Delay–Line Signal Processors, K.P. Jackson, et al., *Optical Signal Processing*, J.L. Horner, ed., Academic Press, San Diego, CA. 1987, pp. 431–476, Jan. 1987.

Noise Performance of Multiplexed Fiber–Optic Sensor Systems with Optical Amplifiers, Joar Saether, et al., *Optical Review*, vol. 4, No. 1A (1997) 138–144 (Jan.–Feb.), Jan. 1997.

Joar Saether, et al., "Optical Amplifiers in Multiplexed Sensor Systems–Theoretical Prediction of Noise Performance, " *Proceedings 11th Optical Fibre Sensor Conference*, Sapporo, May 21–24, 1996, pp. 518–521.

(PASSIVE ARRAY)

AMPLIFIED ARRAY
(COUPLER-AMPLIFIER CONFIGURATION)

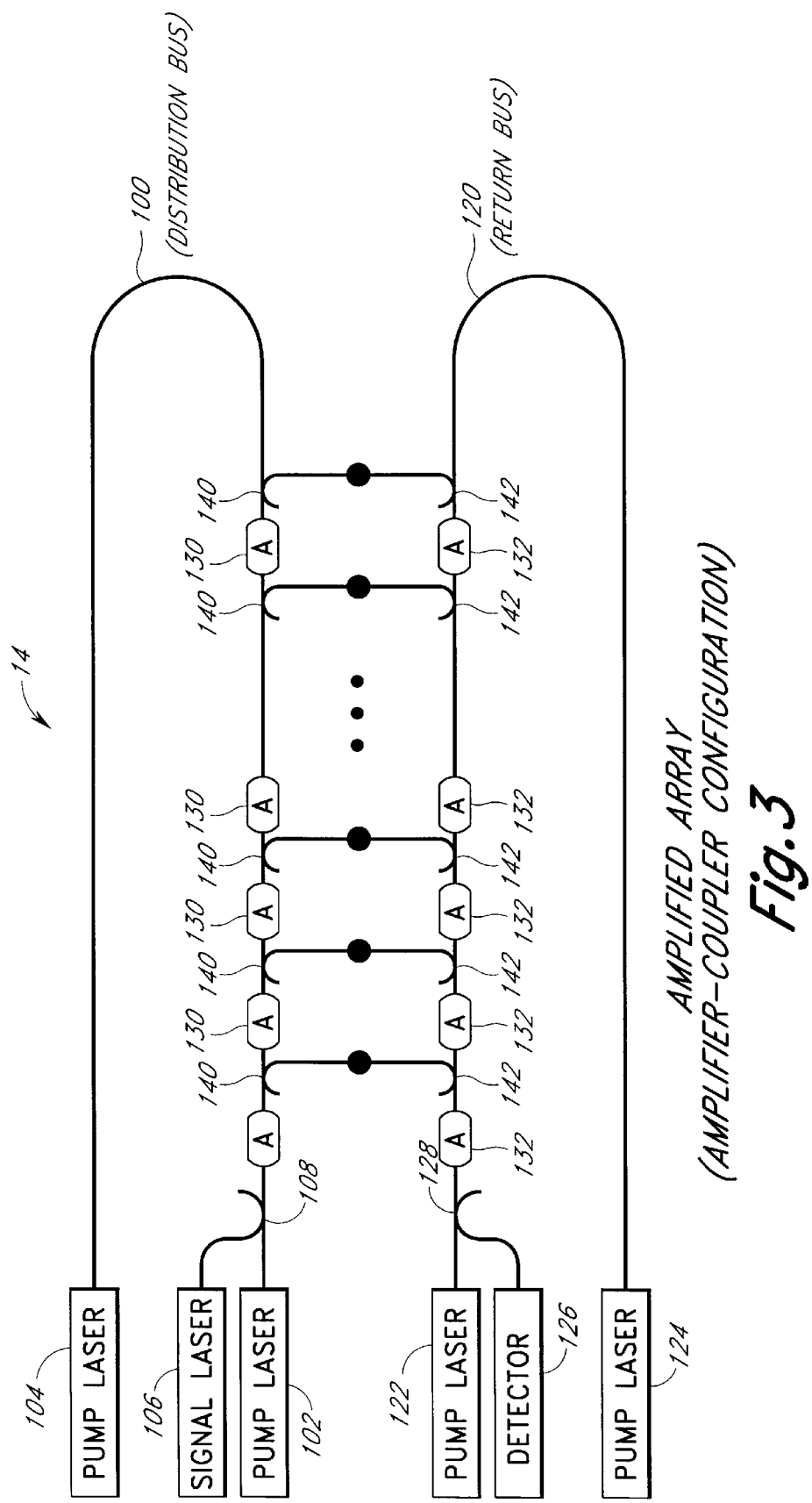

AMPLIFIED SENSOR ARRAY WITH 3 SENSORS PER ARRAY

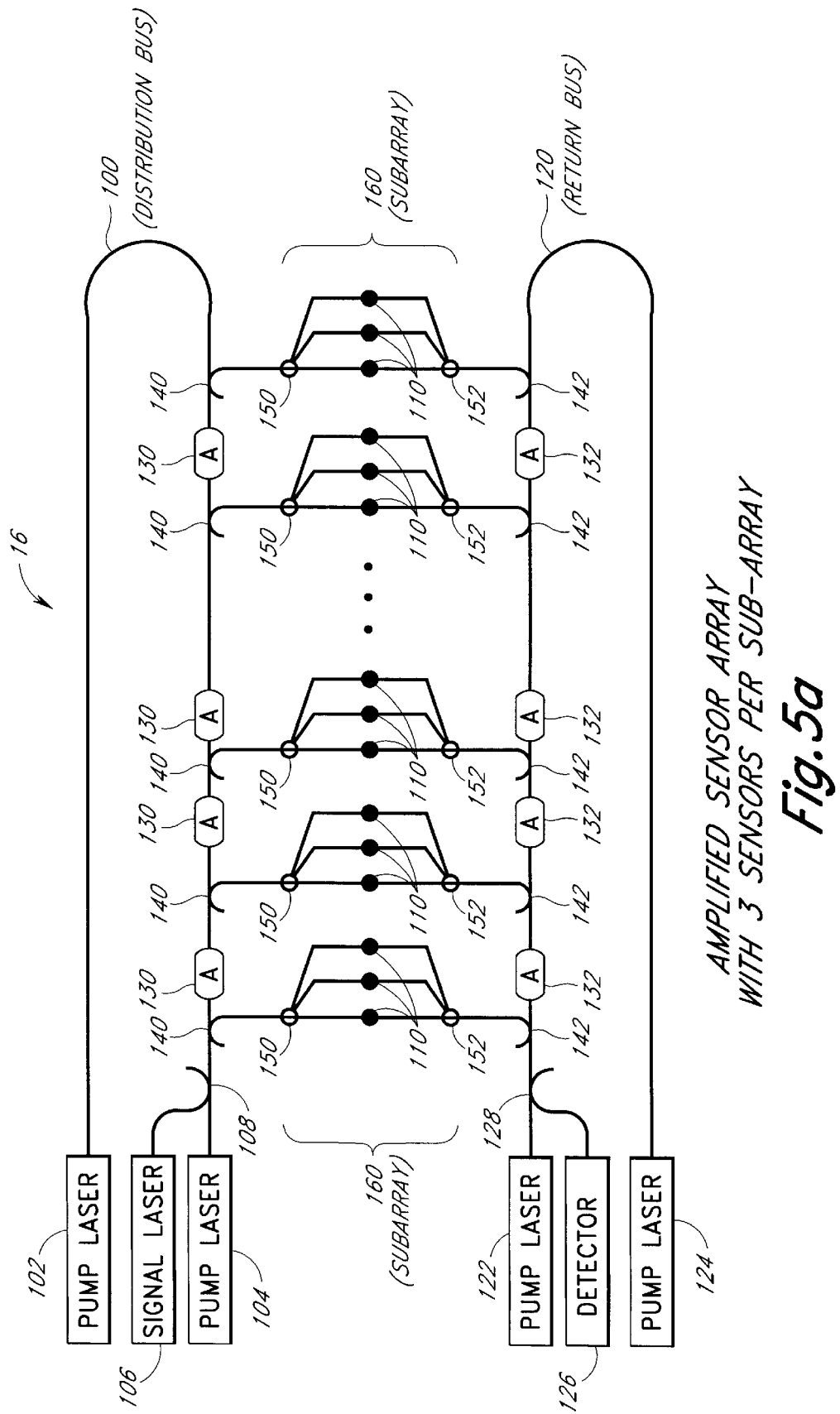
Fig.5a AMPLIFIED SENSOR ARRAY WITH 3 SENSORS PER SUB-ARRAY

AMPLIFIED SENSOR ARRAY WITH 3 SENSORS PER SUB-ARRAY

TIMING DIAGRAM

TIME DOMAIN MULTIPLEXED AMPLIFIED SENSOR ARRAY WITH IMPROVED SIGNAL TO NOISE RATIOS

RELATED APPLICATIONS

This application claims the benefit of priority under 35 U.S.C. §119 (e)(1) of U.S. Provisional application Ser. No. 60/021,699 filed Jul. 12, 1996, U.S. Provisional application Ser. No. 60/034,804 filed Jan. 2, 1997, and U.S. Provisional application Ser. No. 60/036,114 filed Jan. 17, 1997.

FIELD OF THE INVENTION

The field of the invention relates to arrays of fiber optic interferometric sensors and mechanisms for maximizing the signal to noise ratio in amplified sensor arrays that are time domain multiplexed.

BACKGROUND OF THE INVENTION

Arrays of fiber optic interferometric sensors show promise in applications where size, electrical interference, and electromagnetic detection make electronic sensors impractical. Such interferometric sensors are capable of measuring a parameter (i.e., a measurand) with a very high dynamic range (e.g., 120 dB). Optical sensor arrays are formed by connecting a series of sensors using fiber optic lines. If each sensor in an array requires a dedicated fiber to carry the detection signal, the large number of fibers required quickly becomes unwieldy as the number of sensors increases. Thus, as the number of sensors in an optical array increases, time domain multiplexing (TDM) becomes necessary to maintain a low fiber count. Electrical and optical frequency domain multiplexing have been attempted, but they are unmanageable for arrays comprising hundreds of sensors. As a result, large sensor arrays are organized into long strings of sensors which perform TDM by returning information from sensors placed at discrete intervals. A typical passive sensor array using TDM is constructed in a ladder type configuration. This design has only a few fiber lines and allows for a small deployment size. It is desirable to provide a multiplexing scheme which includes a large number of interferometric sensors in an array while preserving the high dynamic range of the sensors and maintains a high signal to noise ratio (SNR).

As shown in FIG. 1, a conventional passive optical array 10 using TDM is formed by using a splitter coupler 140 to couple a distribution bus 100 to a first end of an optical sensor 110. A second splitter coupler 142 couples a return bus 120 to a second end of the optical sensor 110. A detection signal is sent from a source (not shown) which is then partially coupled into the first sensor 110 in an array of n sensors. The remainder of the detection signal continues along the distribution bus to subsequent couplers, each coupling a fraction of the detection signal into successive sensors.

Each sensor modifies the optical signal coupled into it from the distribution bus 100 based on external (e.g., acoustic) perturbations to be detected. The perturbed signal is then coupled onto the return bus 120 by coupler 142. The return bus then transmits the perturbed signals out of the array for processing.

The basic principle of TDM is as follows. The length of the path that the optical signal takes from the source, along the distribution bus 100, through the coupler 140, the sensor 110, the coupler 142 and back along the return bus 120 is different for each sensor. Therefore, the return signals arrive at the detector at different time intervals depending on the path length. Sensors closer to the signal source have a shorter path than sensors near the end of the array. Thus, sensors near the source place the return signals on the return bus slightly earlier than sensors farther down the array. This assumes that the time delay through each of the sensors is relatively equal. The signals are then transmitted outside the array to be sequentially processed by other hardware to extract the sensed information. Because each of the return signals has different time delay based upon differing distances between the sensor and the source, it is possible to use optical signals in a pulsed form. Based on the foregoing, each sensor 110 returns a signal pulse which is slightly delayed from the signal pulse returned by the previous sensor, and therefore enables the various signal pulses to be temporally separated at the detector. To avoid overlap of the returned signals on the return bus 120 and at the detector, the pulse length and frequency of the optical signals are selected so that the return signals do not overlap on the return bus.

FIG. 8 illustrates a timing diagram for a sensor array employing TDM to multiplex the return signals onto the return bus for detection and processing. In time period 1, the signal source outputs a detection pulse of length $\tau$. The signal source then waits a period of $T_{System}$ before resetting itself and repeating the detection pulse (shown as time period 1'). Once the detection pulse has been issued from the signal source, it is split into each sensor. The signal from each sensor returns at a different time depending on each sensor's respective distance from the signal source. The path lengths are chosen carefully so that the return signals are placed on the return bus at successive intervals with only a short intervening guard band ($T_{Guardband}$) between the return signals to prevent signal overlap. Once the last sensor has returned a signal N to the detector, the system waits a reset period ($T_{Reset}$) and then restarts the process. The period $T_{Reset}$ is selected to assure that the return pulse N from the last sensor arrives at the detector before the return pulse 1' from the first sensor arrives in response to the second detection pulse. An exemplary period for $T_{Reset}$ is approximately equal to $T_{Guardband}$. Thus, the repetition period for $T_{System}$ is approximately $N \times (\tau + T_{Guardband})$. For example, for a system having a path difference of approximately 8.2 meters between adjacent sensors, $\tau$ is selected to be approximately 40 nanoseconds and $T_{Guardband}$ is selected to be approximately 1 nanosecond. When the array is configured to include 300 sensors (i.e., N=300), then $T_{System}$ is approximately 12.3 microseconds. For this exemplary configuration, a repetition rate of approximately 80 kHz assures that the last return signal in response to a detection pulse does not overlap with the first return signal in response to the next detection pulse. Note that in FIG. 8 the time offset between the detection pulse and the first return pulse is not shown because the offset varies in accordance with the optical path length from the source to the first sensor, through the first sensor and back to the detector.

The advantage of TDM is that it allows simple interrogation techniques. No switching hardware is necessary, allowing a reduction in the cost and the size of the array. However, one of the problems with TDM is that it reduces the time each sensor is available for detection. If each sensor were given a dedicated fiber to report the result of its detections, it could provide a continuous stream of information. However, when TDM is implemented to reduce the number of fibers, no such continuous reporting is possible. The amount of time any one sensor is sampled is reduced to 1/N of a continuously sampled sensor. As the number of sensors grows, the amount of time and the frequency that any one sensor is sampled is further reduced.

The limited sampling time increases the significance of the signal to noise ratio (SNR). Since under TDM, a short sample is extrapolated to represent a much longer period (N times longer than its actual sample time), it is much more essential that each sample be interpreted correctly by the detector. Noise is a significant source of interpretation errors and therefore the SNR must be kept as high as possible with as little degradation of the SNR along the sensor array as possible. A high SNR reduces the number of interpretation errors by the detection system.

The detection signal experiences a significant loss as it propagates through the passive array. The sources of loss include, for example, (1) fiber loss, splice losses, and coupler insertion loss, (2) sensor loss, and (3) power splitting at each coupler on the distribution and return busses.

Simple splitting (loss item (3)), which is the method used to couple the optical sensor to the distribution and return buses, results in large losses and a severe degradation in the SNR. The amount of light in the detection signal coupled from the distribution bus into the sensor depends on the coupling ratio of the coupler. The coupling ratio approximately represents the fraction of light that is split into the sensors and approximately one minus the coupling ratio is the fraction of light that is passed down the distribution bus to the next coupler. A high coupling ratio results in more power being delivered to each sensor from the distribution bus, but also results in a smaller amount of power being available to downstream sensors. A low coupling ratio increases the power delivered downstream, but limits the power available to each sensor. Consequently, there is a value of the coupling ratio that maximizes the return power from the farthest sensors, as discussed below.

In an array containing N sensors, the power returning from the mth sensor decreases as m increases (where sensor m=1 is the closest sensor to the source). The exception is the signal from the last sensor number N, which does not experience a splitting loss since there is no coupling and the entire remainder of the signal passes through it. In the passive array shown in FIG. 1, the return signal is therefore the weakest for sensor number N−1. To achieve the best output signal-to-noise ratio in a passive optical array, the signal at the detector (1) should carry as much power as permitted by nonlinear effects in the fiber busses, and (2) should be shot noise limited (a condition in which noise originating at the source of the signal dominates the noise characteristic of the signal).

Without specifying particular optical powers, integration times, pulse widths, repetition rates, and the optical filtering needed to determine an absolute output SNR, the following equations define a system noise figure component which can be used to compare different array configurations. The noise figure of interest is the input source SNR divided by the output SNR for the worst sensor in the array (the N−1st sensor). The system noise figure (NF) is defined as:

$$NF_{system} = \frac{SNR_{into\ array}}{SNR_{out\ worst\ sensor}} \quad (1)$$

This definition is consistent with the classical definition of amplifier noise, but is used here to describe the whole system as an amplification-loss transformation.

In order to determine the noise figure of the system, the losses associated with the various elements of the system (e.g., splicing losses, splitting losses, coupler losses, etc.) must be calculated. These losses (L) are considered in dB's (negative dB's in particular). The losses can also be considered in terms of transmissions. For example, a −3 dB loss is a 50% transmission, and a −10 dB loss is a 10% transmission. It is assumed that each sensor imparts the same loss $L_x$ to the signal, and the excess loss due to splices and coupler insertion is the same for all coupler segments and is equal to $L_x$. When all couplers exhibit the same coupling ratio C, it can then be shown that the power returning to the detector from sensor number m is:

$$P_m = P_{into\ array}(1-C)^{2m-2}L_x^{2m-2}C^2L_s \text{ for } m<N \quad (2)$$

For the embodiment shown in FIG. 1, the sensor N receives more optical power than the sensor N−1 because the sensor N is connected directly to the distribution fiber rather than being coupled. The power for the sensor N is:

$$P_N = P_{into\ array}(1-C)^{2N-2}L_x^{2N-2}L_s \quad (3)$$

Thus the returning power is lowest for sensor number N−1. From Equation 2, this power depends on the coupling ratio C and is at a maximum when:

$$C = \frac{1}{N-1} \quad (4)$$

Using Equations 1 and 2, and assuming an optimized coupling ratio (Equation 4), the noise figure for the worst sensor is:

$$NF_{passive} = \frac{(N-1)^{2N-2}}{L_s L_x^{2N-4}(N-2)^{2N-4}} \quad (5)$$

FIG. 4b shows the noise figure for the optimized passive array (solid curve) as the number of sensors increases. The sensor loss is assumed to be $L_s$=6 dB, and is consistent with current sensor technology. The excess loss is assumed to be $L_x$=0.2 dB per coupler segment. FIG. 4b shows that the noise figure level rises rapidly as the number of sensors is increased, revealing the limitations of the passive array configuration.

In order to obtain longer sensor arrays, a passive optical array must accept a reduction in the power available to each individual sensor, and therefore a degradation in the SNR results. With these constraints in mind, maximizing the SNR in TDM sensor arrays has been difficult. One solution is to increase the power in the optical source, which will, under shot-noise limited conditions, increase the SNR of all return signals. However, the maximum power the distribution bus can transmit is limited by nonlinear effects in the optical fiber. A passive array design is therefore limited in its ability to compensate for the low power coupled into each sensor by raising the initial power of the optical source.

SUMMARY OF THE INVENTION

Since the SNR is a large factor in the performance of a TDM optical sensor array, if the levels of noise in the resulting detection signal are high, the limits of current sensor technology cannot be approached and the benefits of highly sensitive sensors can never be exploited. For this reason, the architecture and design parameters of sensor arrays must be selected to minimize the SNR degradation due to splitting, other fiber losses and the presence of other noise. The present invention significantly improves the SNR in a passive optical array by adding optical amplifiers between the couplers to compensate for the coupler splitting losses.

In one advantageous embodiment of the present invention, optical amplifiers are inserted between the couplers along the signal path. The gain of the amplifiers is designed to compensate for the losses due to the previous coupler and other fiber losses. In this way, the overall SNR can be maintained without significant degradation as the number of sensors in the array increases. In a first aspect of the present invention, the amplifiers are located along the distribution and return buses directly after the couplers (except for the last sensor). In a second aspect of the present invention, the amplifiers are located directly before the couplers.

In one embodiment, the optical amplifiers comprise short lengths of erbium-doped fiber spliced into the distribution and return buses. Inexpensive pump sources can be used to pump the amplifiers from both ends of the array at 1480 nm for Er-doped fiber and at 1060 nm for Er/Yb-doped fiber.

Improvements can be made to the SNR when the distribution bus coupling ratios are set at optimal values. The value of the optimal coupling ratio depends upon the amplifier configuration, the excess loss and other configuration parameters.

Additional benefits can be achieved by grouping sensors into parallel configurations along the distribution and return buses. In this way, the number of sensors can be increased significantly without a corresponding increase in the number of amplifiers required. The parallel grouping of multiple sensors can increase the sensor density without a corresponding increase in the number of amplifiers or couplers. This design can improve the SNR by reducing the overall number of amplifiers and couplers, thereby reducing amplifier spontaneous emission noise and coupling losses. Also, the pump power requirements are reduced. This aspect of the present invention also permits smaller sized arrays for an equivalent number of sensors.

One aspect of the present invention is an optical sensor architecture which comprises a plurality of sensors which receive an optical signal and which output perturbed optical signals. A distribution bus is coupled to each sensor to distribute the optical signal to each sensor. A return bus is coupled to each sensor to receive the perturbed optical signal from each sensor to be included as a portion of the return signal. A plurality of first optical amplifiers are distributed at selected positions along the length of the distribution bus to maintain the power of the distributed optical signal at a selected level. A plurality of second optical amplifiers are distributed at selected positions along the length of the return bus to maintain the power of the perturbed optical signals in the return signal.

Another aspect of the present invention is an optical sensor architecture which comprises a plurality of sensor groups. Each sensor group comprises at least one sensor which receives an optical signal and which outputs a perturbed optical signal. A distribution bus is coupled to each sensor group to distribute the optical signal to each sensor group. A return bus is coupled to each sensor group to receive the perturbed optical signal from each sensor group. A plurality of first optical amplifiers are distributed at selected positions along the length of the distribution bus to maintain the power of the optical signal at an adequate level for each sensor group. A plurality of second optical amplifiers are distributed at selected positions along the length of the return bus to maintain the power of the perturbed optical signals on the return bus.

A further aspect of the present invention is an optical sensor architecture which comprises a plurality of means for sensing a parameter; means for distributing a first optical signal to each of the means for sensing; means for returning a second optical signal from each of the means for sensing; a plurality of means for amplifying the first optical signal spaced along the means for distributing; and a plurality of means for amplifying the second optical signal spaced along the means for returning.

A further aspect of the present invention is a method for reducing a noise figure level in a signal returning from a sensor architecture to generate an optical output. The method uses a plurality of sensors to generate output signals. An optical signal is transmitted through a distribution bus coupled to each sensor. The output signal from each sensor is coupled into a return signal carried via a return bus coupled to each sensor. The optical and return signals are amplified at multiple stages along the distribution and the return buses to increase a signal to noise ratio within the sensor architecture.

A further aspect of the present invention is a method for optimizing an array of optical sensors. The method provides an array of optical sensors positioned between a distribution fiber which propagates an input optical signal from a source and a return fiber which returns perturbed optical signals to a detector. Each optical sensor is coupled to the distribution fiber by a respective input coupler and coupled to the return fiber by a respective output coupler. A plurality of amplifiers are interposed at selected locations on the input distribution fiber and the return fiber. The amplifiers compensate for losses in the array. Gains are selected for the amplifiers and coupling ratio are selected for the couplers to optimize a system noise figure. The system noise figure is the ratio of a signal to noise ratio of the input optical signal to a signal to noise ratio of an optical signal in a sensor having a lowest signal to noise ratio.

A still further aspect of the present invention is a method for optimizing an array of optical sensors. The method provides an array of optical sensors coupled to an optical fiber by a plurality of couplers. An optical signal propagating in the optical fiber is amplified by a plurality of amplifiers to compensate for losses in the array. Gains are selected for the amplifiers and coupling ratios are selected for the couplers to optimize a system noise figure. The system noise figure is the ratio of a signal to noise ratio of the input optical signal to a signal to noise ratio of an optical signal in a sensor having a lowest signal to noise ratio.

A still further aspect of the present invention is an optical sensor architecture. The architecture comprises a plurality of sensors which receive an input optical signal and which output perturbed optical signals in response to a sensed parameter. At least one optical fiber distributes an optical signal to each sensor and returns a perturbed optical signal from each sensor. A plurality of optical amplifiers distributed at selected positions along the length of the at least one optical fiber to maintain the power of the distributed optical signal and returned perturbed optical signals at selected levels.

BRIEF DESCRIPTION OF THE DRAWINGS

FIG. 3 illustrates an amplified array in an amplifier-coupler configuration as described in a second aspect of the present invention.

DETAILED DESCRIPTION OF THE PREFERRED EMBODIMENT

Figure 1:
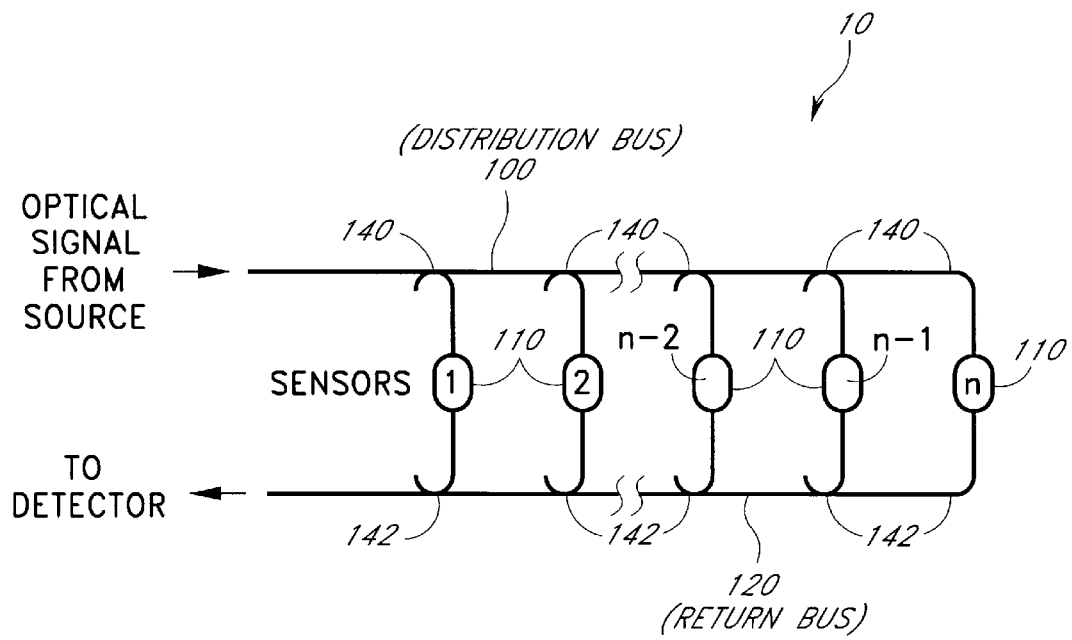
FIG. 1 illustrates a passive array of sensors without amplification.

Passive arrays can be designed to perform time division multiplexing (TDM) of signals by configuring the passive array 10 in the manner shown in FIG. 1. A distribution bus 100 carries a detection signal from a known source along its length. The distribution bus 100 is connected to a number of couplers 140 which couple the detection signal from the distribution bus 100 to a number of sensors 110 located at fixed intervals along the length of the distribution bus 100. Each coupler 140 partially couples the detection signal from the distribution bus 100 into a first end of each sensor 110. Each sensor 110 then modifies the detection signal based on external perturbations (not shown) such as, for example, acoustic signals detected in a seismic exploration activity. A second end of each sensor 110 is connected to a return bus 120 via a coupler 142. The return bus 120 thus receives the modified signal from the optical sensor 110 and transmits it to a detector external to the array (not shown). Because of the ladder-like shape of the array 10, each path from the distribution bus 100 through a sensor 110 to the return bus 120 is often referred to as a rung.

Since the distance the signal must travel through the array depends on which sensor the signal is coupled into, the modified signal output from the sensors 110 is placed on the return bus 120 at different time intervals depending on the distance between the sensor 110 and the source. Sensors closer to the source return the modified signal to the processor at an earlier time than those sensors located farther along the distribution bus 100. In this way, the signals from the optical sensors are time division multiplexed onto the return bus 120. The detector receives the modified signals sequentially at time intervals determined by the length of the source pulse, the repetition rate of the pulse and the distance between each of the sensors.

In a passive array, the SNR experiences a significant degradation as the number of sensors in the array grows. FIG. 4b shows that the noise figure level increases monotonically with the number of sensors in the array for passive arrays. This is because each successive sensor coupler weakens the source signal before it travels to the next coupling. If the coupling ratio is 0.1, then 10% of the source signal is coupled into the first sensor, and 90% of the signal is passed along to the next sensor. The second coupler in the series couples 10% of the remaining signal into the second sensor, which is only 9% of the original signal, and pass 90% of the remaining signal on to the next sensor which is only 81% of the original signal. Thus, the power provided to sensors in later stages of the sensor array is significantly degraded from its original strength. Thus, if the coupling ratio was 0.1, then the 100th sensor would receive a detection signal that is only $0.9^{99} \times 0.1$ (i.e., 0.0003%) of the detection signal's original strength. Furthermore, the power returned to the detector is only $(0.9^{99} \times 0.1)^2$ (i.e., 0.0000000009%) of the detection signal's original strength (assuming no loss in the sensor).

Figure 2:
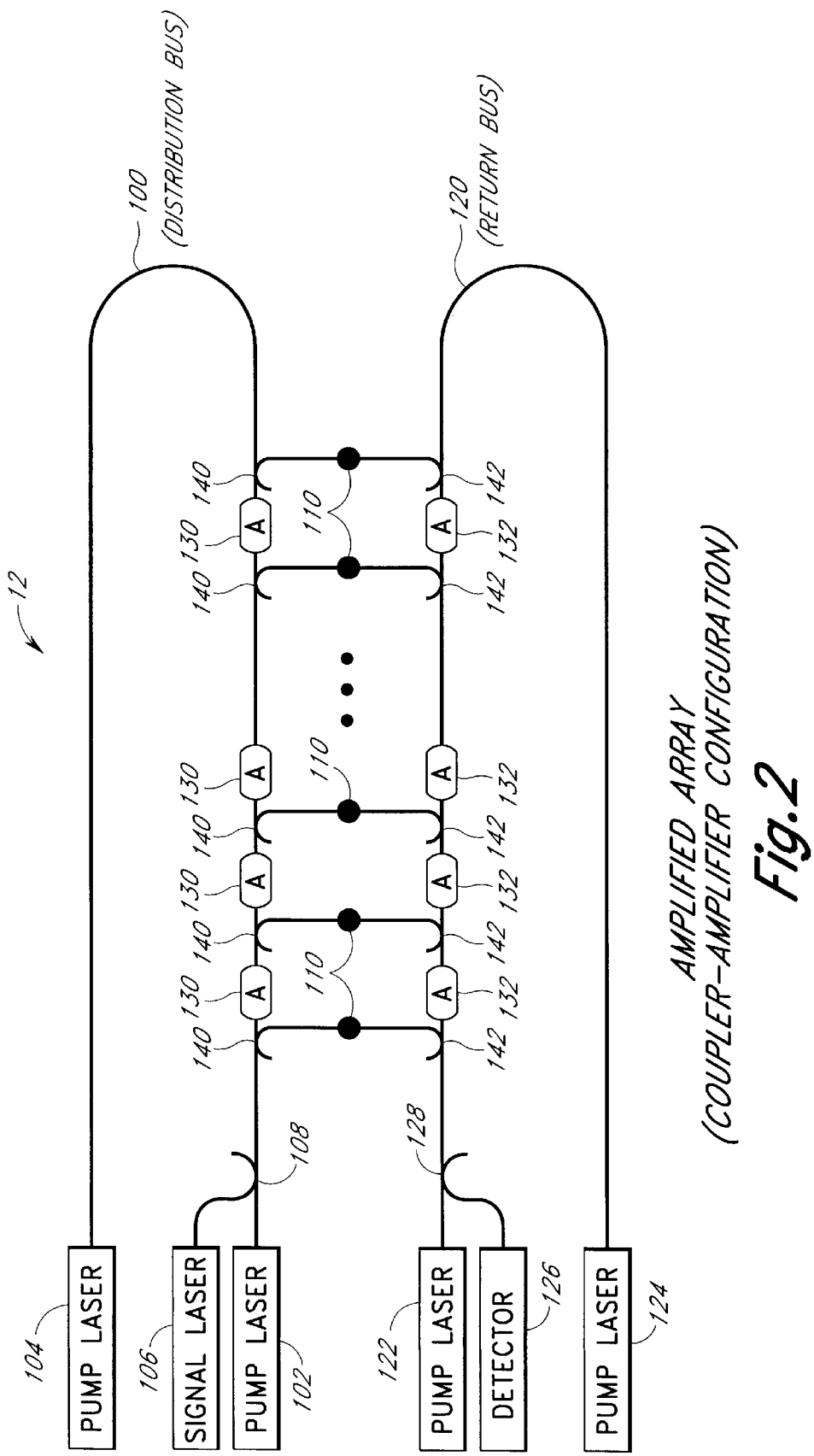
FIG. 2 illustrates an amplified array in a coupler-amplifier configuration as a first aspect of the present invention.

FIG. 2 shows a first aspect of the present invention as an array 12 in a coupler-amplifier configuration in which degradation of the SNR is prevented through the use of erbium-doped fiber amplifiers (EDFA) 130, 132. The EDFAs 130, 132 regenerate the optical signals periodically as they progress through the array. The EDFAs 130, 132 are formed by splicing a section of Er-doped fiber into the distribution and return buses. By using amplifier pump lasers, the Er-doped fiber can function as an optical amplifier. Any number of different types of fiber waveguide optical amplifiers can also be used. Yb:Er:glass fiber and Nd-doped LiNbO$_3$ waveguides are among many different types of optical amplifiers that can be used advantageously with the present invention in the place of the Er-doped fiber amplifiers.

Ideally, the Er-doped fiber should be pumped from both ends of each bus (i.e., the distribution bus 100 and the return bus 120), at a wavelength of 1480 nm. This reduces the overall pump power required to ensure that every amplifier is sufficiently pumped.

In particular, a first pump laser 102 is coupled to a first end of the distribution bus 100 such that substantially all of the pump light is coupled into the distribution bus 100 to propagate in a forward direction along the distribution bus 100. A second pump laser 104 is coupled to the opposite end of the distribution bus 100 such that the pump light from the second pump laser 104 propagates in the opposite direction through the distribution bus 100. The distribution bus 100 carries an optical signal coupled from a signal source 106 along its length. The signal source 106 is coupled to the distribution bus via a wavelength division multiplexer 108. In the embodiment shown, the wavelength division multiplexer 108 is selected to couple substantially all the signal light from the signal source 106 to the distribution bus 100. As is well known in the art, substantially none of the light from the pump source 102 is coupled by the wavelength division multiplexer 108 such that the pump light remains in the distribution bus 100.

The distribution bus 100 is connected to the couplers 140 which couple the distribution bus 100 to a number of sensors 110 located at fixed intervals along the length of the distribution bus 100. The distribution bus is also connected to a number of the erbium-doped fiber amplifiers 130 which are located along the distribution bus 100 and are placed directly after each of the couplers 140. Each coupler 140 partially couples the detection signal from the distribution bus 100 into a first end of each sensor 110. The coupling ratios are typically much larger for an optimized practical amplified array than for an optimized practical passive array. Each sensor 110 then modifies the signal based on an external input (e.g., acoustic signals, not shown).

Each of the couplers 142 couples a second end of each sensor 110 to the return bus 120 which receives the modified signal from the sensor 110 and returns it to a detector 126 external to the sensor array. The return bus signals are amplified by amplifiers 132 to compensate for the signal splitting by the return couplers 142. The amplifiers 132 receive pump power from a third pump laser 122 which couples pump light to a first end of the return bus 120 to propagate in a first direction in the return bus 120 and from a fourth pump laser 124 which couples light to the opposite end of the return bus 120 to propagate in the opposite direction of the light from the third pump source 124. The detector 126 is coupled to the return bus 120 proximate to the first end by a wavelength division multiplexer 128 which couples light at the signal wavelength from the return bus 120 to the detector 126 but which does not couple light at the pump wavelength.

In one advantageous embodiment of the present invention, the signal couplers 140, 142 which couple the optical signal to and from the respective sensors are wavelength division multiplexers. Wavelength division multiplexers are constructed to couple only preselected wavelengths into the sensors. Light having a wavelength which is not one of the preselected wavelengths is not coupled and is passed through the wavelength division multiplexer. By preselecting the signal wavelength as the wavelength to be coupled, the present invention is able to couple only the optical signal into the sensors, allowing the amplifier pump light to pass through the multiplexer uncoupled. This prevents a significant degradation of the amplifier pump light as it progresses along the distribution bus.

Once the source signal passes through the first coupler 140 to the first optical sensor 110, the signal remaining on the distribution bus 100 is amplified by one of the EDFAs 130 which has a gain selected to increase the power of the optical signal back to the approximate power (e.g., 90–110 percent) of the original optical signal. The gain of the EDFA 130 is selected to substantially compensate for the signal power loss caused by the immediately preceding coupling and external losses. The signal is successively coupled and amplified by alternating couplers 140 and optical amplifiers 130 as the signal continues to travel down the length of the distribution bus 100. In this way, the input pulse travels along the distribution bus 100 gaining and losing power at every stage while experiencing minimal overall gain or loss. A similar configuration is provided on the return bus. This configuration, shown in FIG. 2, is referred to as the coupler-amplifier configuration.

The present invention avoids the signal degradation problem prevalent in the passive array of FIG. 1. Each sensor 110 receives a source signal having substantially the same power, even though the sensor 110 may be far along the distribution bus 100 and the signal may have undergone many previous sensor couplings. The present invention is also able to keep the power level of the optical signal at a manageable level to thereby avoid nonlinearity effects in the fiber which occur as optical powers in the fiber increase.

A second aspect of the present invention is an array 14 as shown in FIG. 3. In this embodiment, the EDFA amplifiers 130 are inserted along the length of the distribution bus 100 as in FIG. 2, but are placed before the couplers 140 so that the source signal is amplified before the coupling losses are incurred. The gain of each amplifier 130 is set to compensate for the expected signal power loss in the coupler 140 that follows the amplifier 130. In this configuration, the optical signal experiences a gain before the loss, which changes the noise characteristics and the optimum values for the coupling ratio. This configuration is referred to as the amplifier-coupler configuration.

Figure 4A:
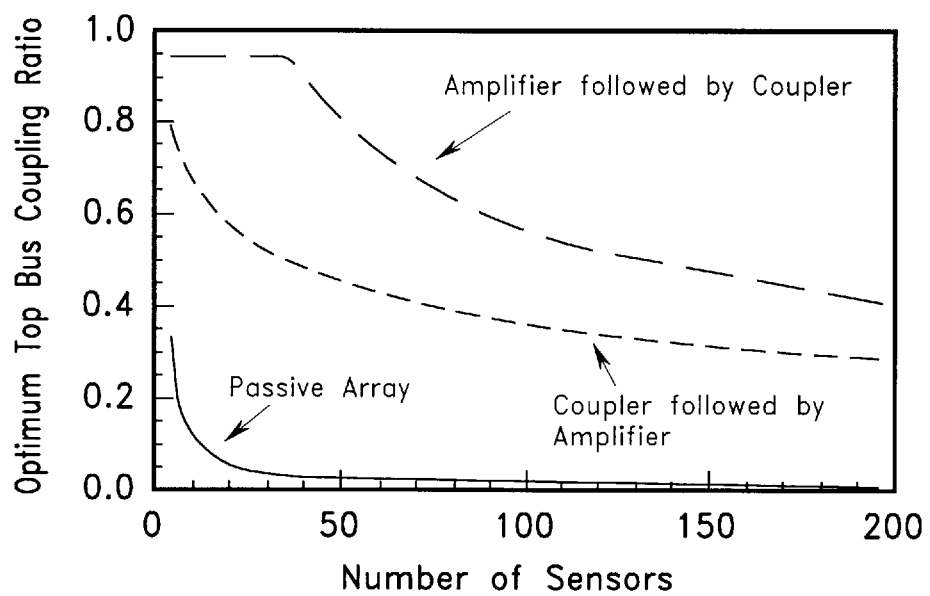
FIG. 4a illustrates the optimal distribution bus coupling ratios for a passive array and amplified arrays for both the coupler-amplifier and the amplifier-coupler configurations, for one sensor per rung.
Figure 4B:
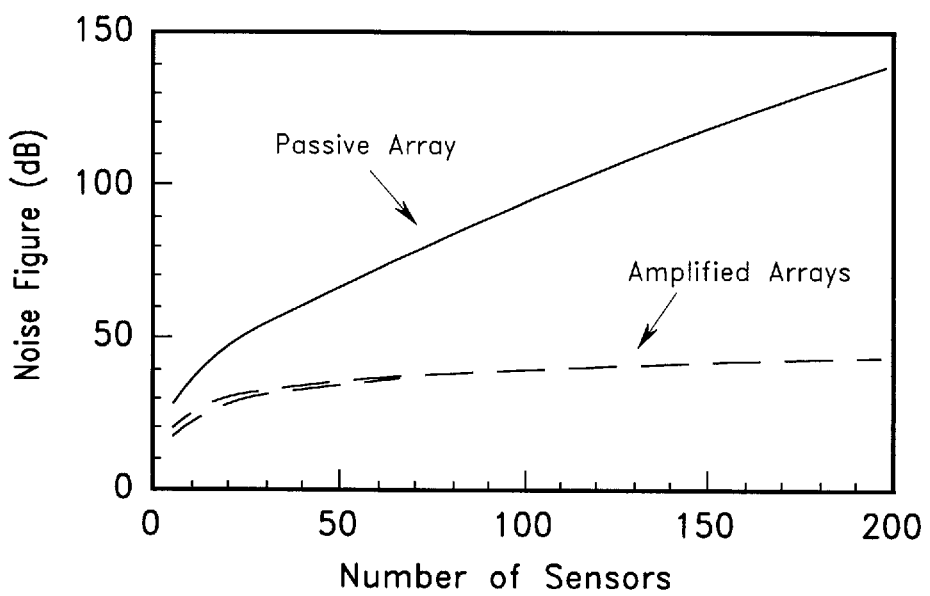
FIG. 4b illustrates the noise figure of the worst sensor as the number of sensors increases for both passive and amplified arrays, wherein, for the amplified array, all the sensors have nominally the same noise figures.

FIG. 4a shows the optimum distribution bus coupling ratios for the passive and the amplified arrays in both the coupler-amplifier and the amplifier-coupler configurations for one sensor per rung and 100 rungs per array (i.e., a total of 100 sensors in the array). The arrays shown in FIG. 4a have a loss $L_x=0.2$ dB and a sensor loss $L_s=6$ dB. The amplified array uses a distribution bus coupling ratio optimized to reduce the noise figure, and a return bus coupling ratio of 3 dB. FIG. 4a shows that for the amplified arrays shown in FIGS. 2 and 3, an optimum coupling ratio does exist for the couplers on the distribution bus and that as the number of sensors increases, the optimum distribution bus coupling is reduced for both the coupler-amplifier and the amplifier-coupler configurations.

FIG. 4b shows that both amplified array configurations exhibit the same noise figure dependence, quickly increasing to noise figures of 30 dB, then slowly growing from there, reaching only 44 dB when N is equal to 200 sensors. In comparison, the passive array noise figure (plotted from Equation 5) grows far more quickly throughout the range of interest, resulting in a prohibitively high noise figure level of 140 dB at 200 sensors. For large sensor arrays (100 or more sensors), an amplified array provides a large improvement in the SNR over a standard passive array. If a noise figure of no more than, say 40 dB is acceptable, the optimized passive array can have only about 12 sensors, whereas the amplified arrays can accommodate as many as 100 sensors, i.e., nearly ten times as many as in the passive array for the same noise figure.

In a third aspect of the present invention, the single sensor 110 between each pair of couplers 140, 142 shown in FIGS. 2 and 3 is replaced by a sub-array of sensors as shown in an array 16 in FIG. 5a. As described above, a distribution bus 100 receives a signal from the external source and carries it along its length. A portion of the signal is split by the coupler 140 as in the above configurations. However, a star fiber coupler 150 then couples an approximately equal fraction of the signal into each sensor 110 of a sub-array 160 which is a passive array comprising a small number of the sensors 110. The star fiber coupler 150 splits the detection signal equally among the sensors in the sub-array. The signals split by the star fiber coupler 150 propagate through respective ones of the sensors 110 and are coupled back onto the return bus 120 by another star fiber coupler 152 and the coupler 142. By choosing a different length for each of the fibers in the sub-array 160, the length of each signal path through the sub-array 160 is unique. This prevents the pulses from each of the sensors 110 in the sub-array 160 from overlapping in time on the return bus 120 as time division multiplexing is used. In addition, the total path length from the last sensor in a sub-array must be smaller than the total path length of the first sensor in the next sub-array. This will prevent two sensors from having the same overall path length and overlapping in time on the return bus.

Once on the return bus 120, the perturbed signals progress through the gain-loss cycle until they reach the detector and a processing apparatus (not shown). This aspect of the present invention has the advantage of reducing the number of amplifiers needed in the array. Additional advantages include lower pump power requirements and better signal to noise ratio (SNR) to a certain point, and the capability of supporting arrays of up to 400 sensors.

Figure 5:
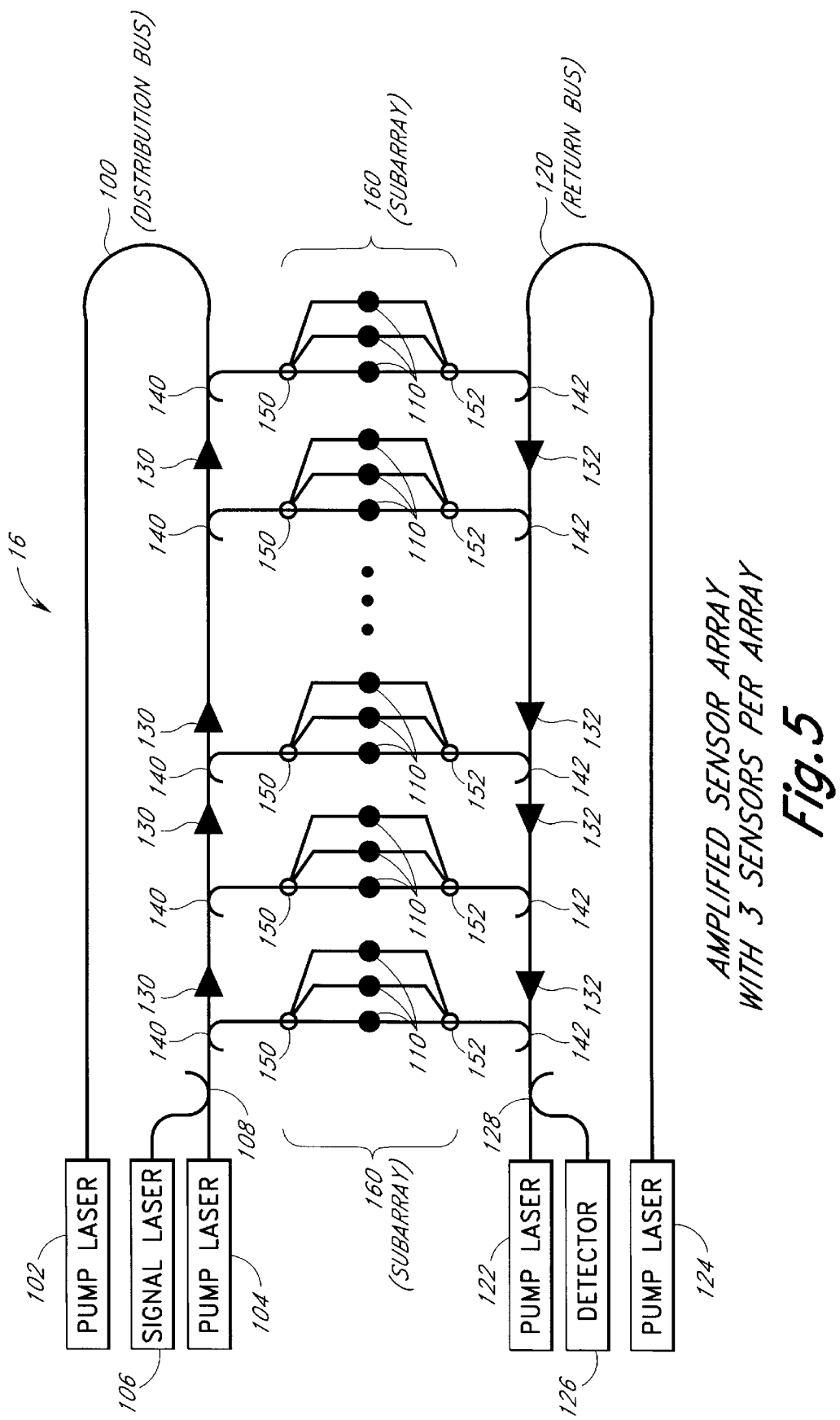
FIG. 5a illustrates an amplified array in accordance with a third aspect of the present invention with multiple sensors in a sub-array and in a coupler-amplifier configuration using star fiber couplers to distribute signals within each sub-array.
FIG. 5b illustrates an amplified array similar to FIG. 5a wherein a distribution bus and a return bus is provided within each sub-array.
Figure 5B:
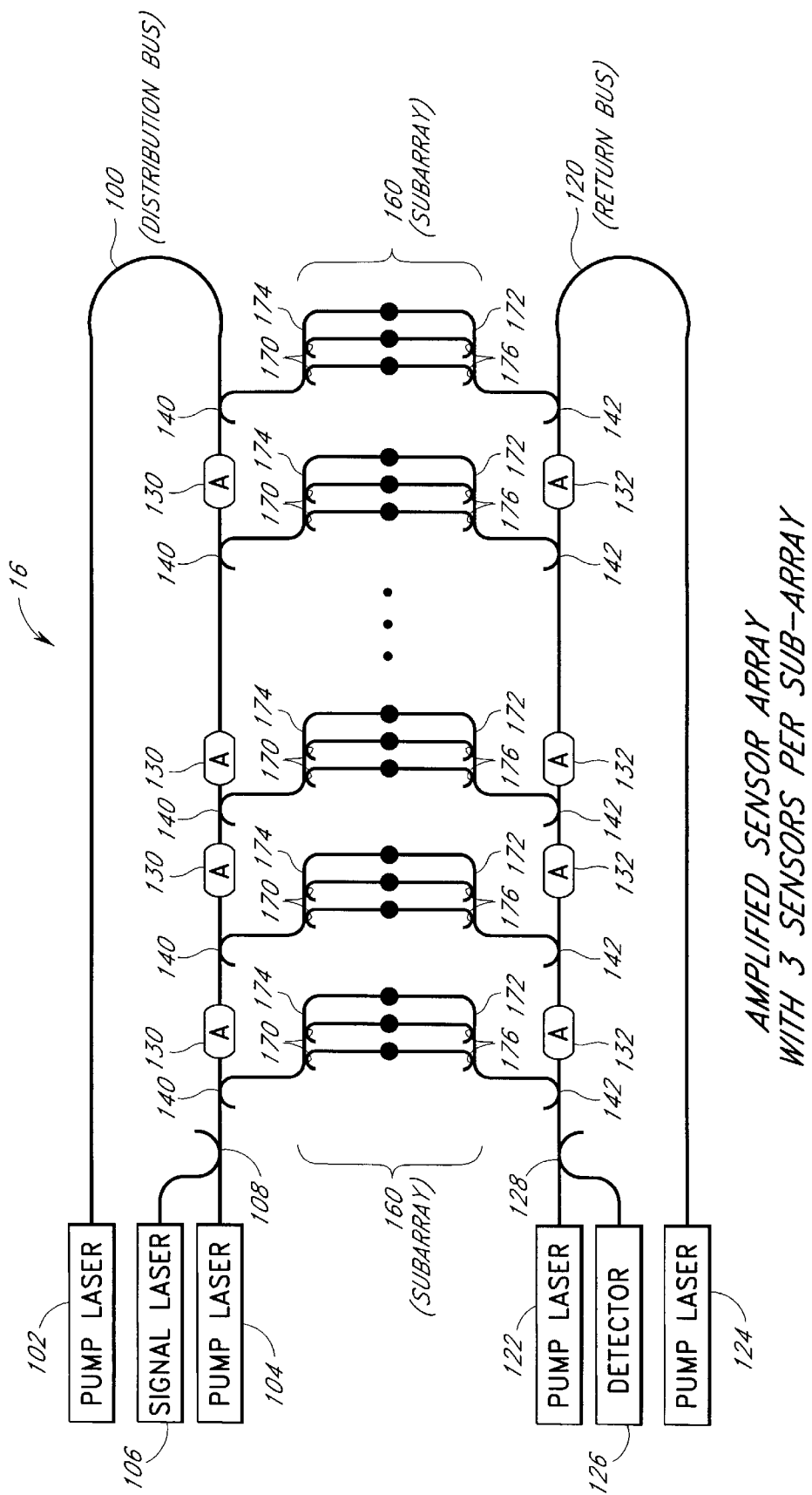

FIG. 5b illustrates an alternative embodiment to FIG. 5a in which the fiber star couplers 150, 152 are replaced by distribution bus 170 and a return bus 172 in each sub-array which are coupled to the sensors 110 via respective distribution couplers 174 and return couplers 176. It should be understood that combinations of star couplers and a return bus, or a distribution bus and star couplers can also be used to couple to and from the sensors in the sub-arrays.

Figure 6A:
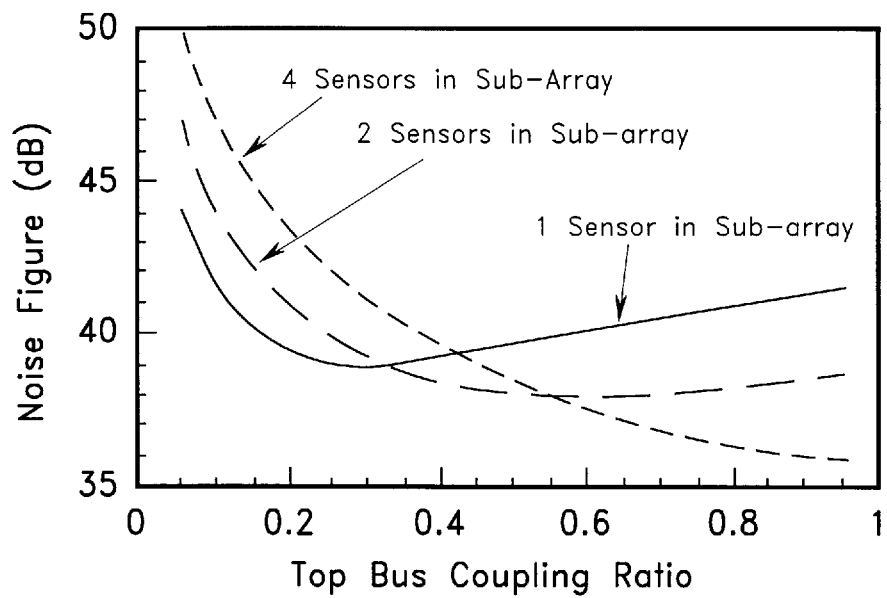
FIG. 6a illustrates the noise figure for the worst sensor for the sensor array shown in FIG. 5a for various distribution bus coupling ratios and for various numbers of sensors in the sensor sub-array in an amplifier-coupler configuration 100 sensors long, wherein all the sensors have nominally the same noise figures.

FIG. 6a illustrates the effect of changing the coupling ratio and the number of sensors in each sub-array in the amplifier-coupler configuration on the system noise figure for an array having a total of 100 sensors. For 1 and 2 sensors per sub-array, there is an optimum coupling ratio that minimizes the noise figure. For 1 sensor per sub-array, the minimum noise figure is 39 dB at a coupling ratio of 0.28. Where there are 2 or 4 sensors per sub-array, the noise figure is lower. In a configuration with 2 sensors, the noise figure is at a minimum of 38 dB when the coupling ratio is 0.55. This result shows that by using 2 sensors per sub-array instead of 1, the same noise figure level can be obtained in a system that requires half as many amplifiers for the same total number of sensors. The reason for this reduction in noise figure is a reduction in the overall amplified spontaneous emission (ASE) noise due to a reduction in the number of amplifiers for an equivalent number of sensors.

When signal-ASE beat noise limits the SNR instead of shot noise, reducing detected power does not have a strong effect on the output SNR. While 2 sensors per sub-array does result in lower detected powers (by one quarter), it also reduces the amount of signal-ASE beat noise, yielding slightly better performance. FIG. 6a shows that with 4 sensors per sub-array, the noise figure continues to improve as the coupling ratio approaches unity. With a high coupling ratio of 0.95, the system noise figure can be dropped to 36 dB. Thus, by doubling the number of sensors in the sub-array, and halving the number of bus amplifiers and couplers, both the total number of components and the total pump power requirements can be decreased while maintaining the SNR system performance.

Figure 6B:
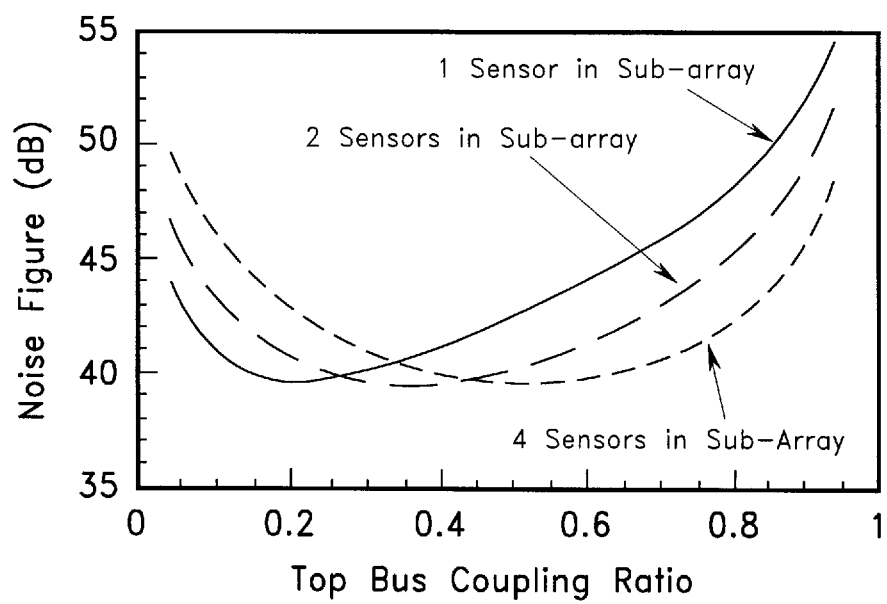
FIG. 6b illustrates the noise figure for the worst sensor for the sensor array shown in FIG. 5a for various distribution bus coupling ratios and for various numbers of sensors in the sensor sub-array and in a coupler-amplifier configuration 100 sensors long, wherein all the sensors have nominally the same noise figures.

FIG. 6b shows the same analysis for the coupler-amplifier configuration. As above, the value of the optimum coupling ratio depends on the number of sensors in the sub-array, but the noise figure does not. FIG. 6b shows that as the number of sensors in the sub-array increases from 1 to 2 to 4, the value of the optimal coupling ratio changes from 0.2 to 0.35 to 0.55 while the noise figure remains constant at just under 40 dB.

Figure 6C:
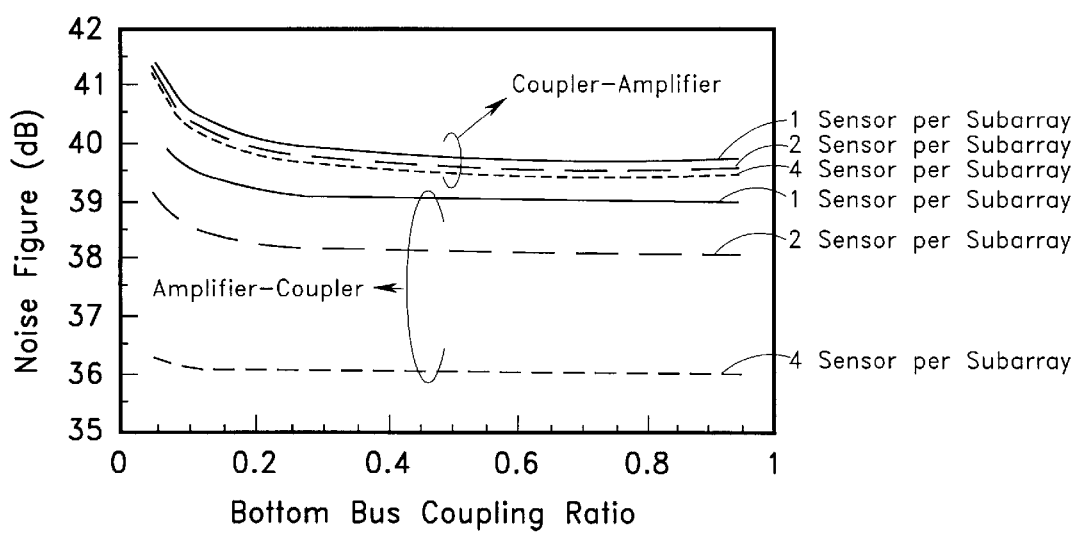
FIG. 6c illustrates the noise figure for the worst sensor for the sensor array for various return bus coupling ratios and for various numbers of sensors in the sub-array.

The return bus couplers 142 do not have an optimum coupling ratio, but give better results with higher coupling, as illustrated in FIG. 6c. The noise figure level is shown for both amplifier-coupler and coupler-amplifier configurations and for different sizes of the sub-array. For all configurations, the distribution bus coupling ratio is optimized and the total number of sensors is 100. As the return bus coupling ratio is increased from 0.2 to 0.95, the noise figure level degradation for either configuration shown in FIG. 6c and for 1, 2 or 4 sensors per sub-array is less than 1 dB. The return bus coupling can therefore be freely selected based on amplifier pump considerations (a lower coupling ratio means a lower pump power requirement). The spread in noise figure levels for different array configurations is a result of selecting the optimum distribution bus coupling ratio as shown in FIG. 6a.

The following defines the system parameters:
n=number of sub-arrays
j=number of sensors per sub-array
nj=total number of sensors
$C_d$=coupling ratio for the distribution bus (couplers 140)
$C_r$=coupling ratio for the return bus (couplers 142)
$L_x$=splice and insertion loss in each coupler segment
$L_s$=sensor loss
$n_{sp}$=amplifier inversion parameter Because of the presence of the optical amplifiers 130 and 132, which add amplified spontaneous emission (ASE) to the signal, the output of the amplified array is no longer shot noise limited as in the passive array, but shot noise and signal-ASE beat noise are the dominant terms. To obtain the noise figure for the worst sensor, the noise figure calculation must now account for the ASE from all the amplifiers.

It is assumed that each amplifier 130 on the distribution bus is identical and has the same gain. Likewise, it is assumed that the amplifiers 132 on the return bus have identical gain, along with an inversion parameter equal to that of the amplifiers on the distribution bus. While remote pumping of the amplifiers 130, 132 from each bus end allows the system to approach this condition, in practice the amplifiers are slightly different due to manufacturing tolerances and nonuniform pump and signal powers. The gain is set equal to the loss on the bus, resulting in a gain of:

$$G_d = \frac{1}{L_x(1 - C_d)} \quad (6)$$

for the distribution bus amplifiers 130, and a gain of:

$$G_r = \frac{1}{L_x(1 - C_r)} \quad (7)$$

for amplifiers 132 on the return bus. The input signal is assumed to be pulsed, and the pump to be on continuously, resulting in continuous ASE. Thus, although the path length for every sensor 110 is different, the ASE that traveled through one sensor 110 can effect the noise characteristics of a signal from a different sensor 110.

Because of the strong signal powers, the ASE-ASE beat noise and the ASE shot noise can be neglected in system design. For the configuration shown in FIG. 3, where an amplifier 130, 132 is placed before the first coupler on both busses 100, 120, the noise figure level is:

$$NF_{amplifier-coupler} = \qquad (8)$$

$$\frac{j^2 L_x^2 (1 - C_r)(1 - C_d)}{C_d C_r L_s} + j[1 - (1 - C_d)L_x]n(n + 1)n_{sp} +$$

$$\frac{2j^2 L_x n(1 - C_d)[1 - (1 - C_r)L_x]n_{sp}}{C_d C_r L_s}$$

Note that this expression is the same for every sensor 110, unlike that of the passive array configuration. The response of every sensor is affected by signal-ASE beat noise equally.

Equation 8 can be advantageously used to select an optimum combination of number of rungs and number of sensors per rung for a required number of sensors. In particular, integer values of n (number of sub-arrays or rungs) and j (number of sensors per sub-array) having a product close to or equal to the required number of sensors are substituted into Equation 8 and the value of the noise figure level calculated for each combination. The combination which produces the lowest noise figure level is then selected as the optimum combination for the required number of sensors.

Using the same approach as for Equation 8, it can be shown that the noise figure level for the coupler-amplifier system is now:

$$NF_{coupler-amplifier} = \frac{j^2}{C_d C_r L_s} + \frac{j[1-(1-C_d)L_x]n(n-1)n_{sp}}{(1-C_d)L_x} + \frac{2j^2(n-1)[1-(1-C_r)L_x]n_{sp}}{C_d C_r L_s} \quad (9)$$

To optimize the amplified array performance, it is necessary to examine the effect of the distribution and return bus coupling ratios on the system noise figure level as was done for the passive array. Equations 8 and 9 show that there is no optimum coupling ratio for the return bus 120. The system is largely insensitive to the choice of $C_r$. There does exist an optimum coupling ratio for the couplers 140 on the distribution bus, as shown in FIG. 4a. The excess loss was chosen to be 0.2 dB, the sensor loss was chosen to be 6 dB, and the amplifier inversion parameter $n_{sp}$ was chosen as 1.5. 3 dB couplers are used on the return bus 120, with two sensors 110 in each sub-array. As the number of sensors 110 in the array increases, the optimum distribution bus coupling $C_d$ drops for both configurations. In can be shown that for large numbers of sensors, with one sensor per rung (one amplifier per bus per sensor), the optimum coupling ratio approaches:

$$C_{d(amplifier-couplers)} = \frac{\sqrt{2j[1-(1-C_r)L_s]}}{\sqrt{nC_r L_s}} \quad (10)$$

for the amplifier-coupler configuration and $$C_{d(coupler-amplifier)} = \frac{\sqrt{2j[1-(1-C_r)L_x]L_x}}{\sqrt{nC_r L_s}} \quad (11)$$

for the coupler-amplifier configuration. In both configurations the optimum value for $C_d$ depends not only on the number of sensors 110 in the system, but also on the sensor loss, excess loss, number of sensors in a sub-array, and the amplifier inversion. Both optimum coupling ratios fall off as $1/n^{1/2}$, compared to approximately $1/N$ for the passive array of FIG. 1. The amplifier-coupler configuration requires higher optimum coupling ratios, approaching 1 for low numbers of sensors. In the following analysis, at the values of n where the optimum value of $C_d$ is predicted to be close to unity, it has actually been limited to 0.95, since a $C_d$ too close to 1 would require an distribution amplifier 130 with an unrealistically high gain. Similarly, a $C_r$ too close to 1 would require a return amplifier 132 with an unrealistically high gain.

Figure 7A:
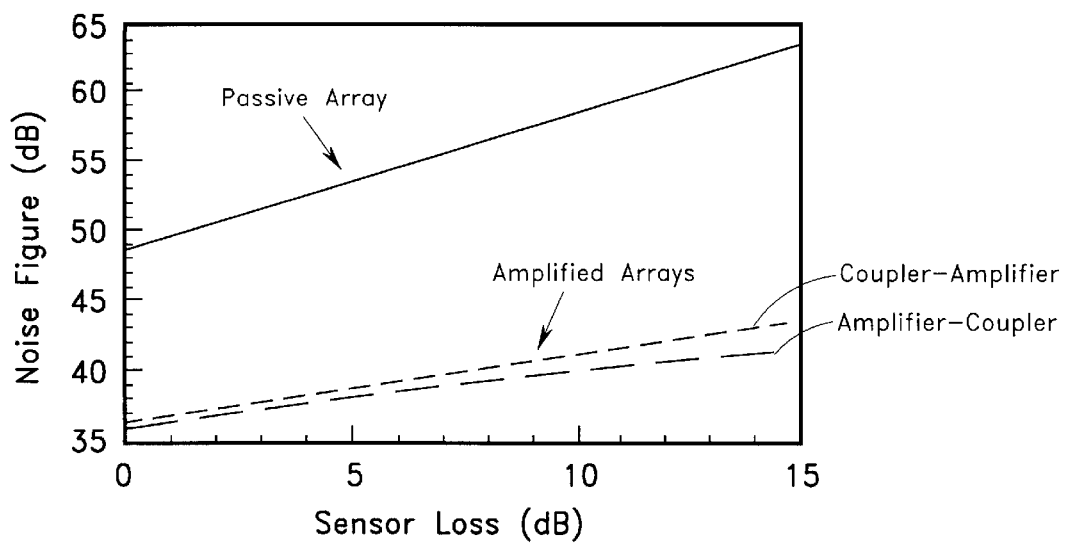
FIG. 7a illustrates the effect of sensor loss on system noise figures for passive and amplified arrays of 100 sensors with 1 sensor per sub-array and a return bus coupling ratio of 0.5.

The sensor loss figures also affect the optimal coupling ratios. In the above situation, the sensor loss was assumed to be 6 dB. This was chosen to account for a 3 dB loss in an unbalanced Mach-Zehnder sensor and a 3 dB fiber bending loss in a coiled sensor. FIG. 7a demonstrates the effect of different sensor losses on the noise figure of the worst sensor in the array with 100 sensors for both passive and amplified arrays. Both passive and amplified arrays experience noise figure degradation of the signal as sensor losses increase. Over a sensor loss range of 0 to 15 dB, the amplified arrays degrade at most 8 dB, while the passive array degrades 15 dB. There is also an advantage to the amplifier-coupler array configuration over the coupler-amplifier configuration as shown in FIG. 7a. The two configurations begin only 0.3 dB apart when the sensor loss is at zero. However, at a 15 dB sensor loss, the amplifier-coupler configuration has a noise figure level almost 2 dB below the coupler-amplifier configuration.

Figure 7B:
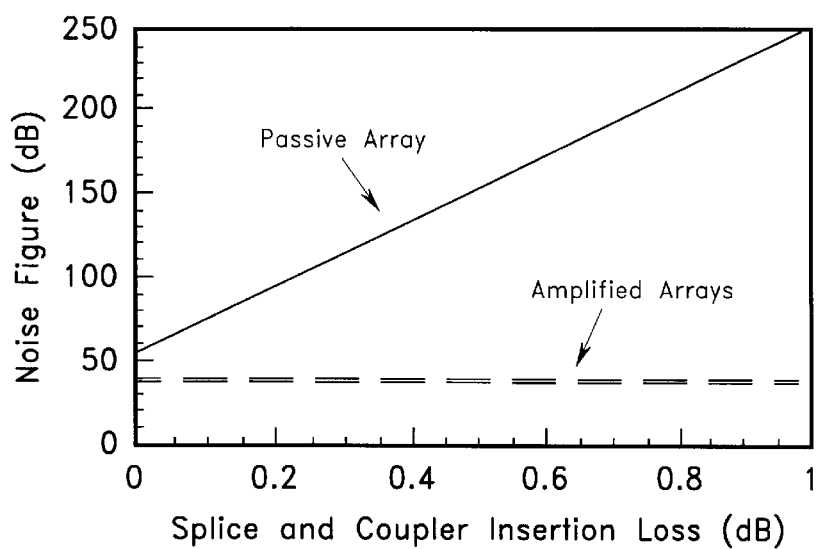
FIG. 7b illustrates the effect of splice and coupler insertion loss on system noise figure for passive and amplified arrays of 100 sensors.
Figure 8:
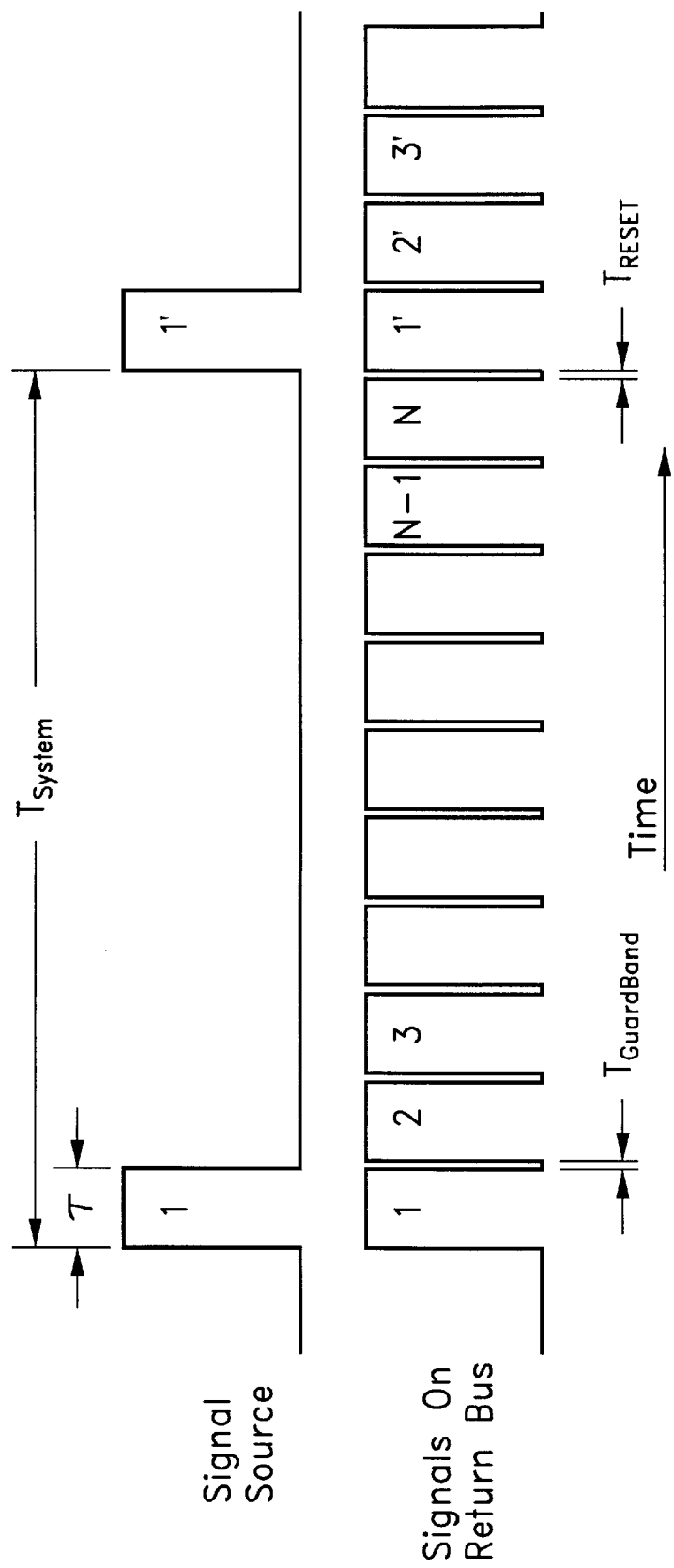
FIG. 8 illustrates a timing diagram of the detection signal and the return signals using time division multiplexing.

FIG. 7b demonstrates the effect of excess loss on both the passive and amplified arrays in a 100 sensor array with one sensor per sub-array. As the excess loss on the busses increases from 0 to 1 dB per coupler segment, the amplified arrays experience only a 2 dB noise figure level degradation. Preferably, in the amplified arrays, extra gain is added as extra loss is encountered such that the gain is always equal to the loss. The passive array noise figure level increases from 55 dB with no excess loss to as much as 255 dB at a 1 dB splice and coupler loss. This demonstrates the extreme sensitivity of the passive array to component losses, while the amplified arrays remain fairly stable as component losses increase, as long as these losses are known in advance and sufficient gain is included to compensate for higher insertion losses. Typical splice and insertion losses are about 0.2 dB, giving a passive array a 40 dB increase in noise figure and leaving the amplified array relatively unchanged.

Amplified arrays clearly outperform standard passive arrays, resulting in a lower system noise figure and improved SNR at the detector when coupling ratios are optimized. For realistic splice and insertion loss levels, the amplified arrays are shown to have equivalent SNR characteristics for arrays having a number of sensors an order of magnitude larger than the number of sensors in passive arrays. The optimum coupling ratio depends on array configuration and the number of sensors in the array, and provides the preferred design parameters to maximize the SNR for amplified sensor arrays. In all cases, the amplifier-coupler configuration has been shown to outperform the coupler-amplifier configuration, demonstrating slightly lower noise figure levels across all relevant parameters. For large scale sensor deployment where fiber count and system complexity are of concern, amplified TDM arrays show significant promise over conventional passive TDM arrays.

Figure 9:
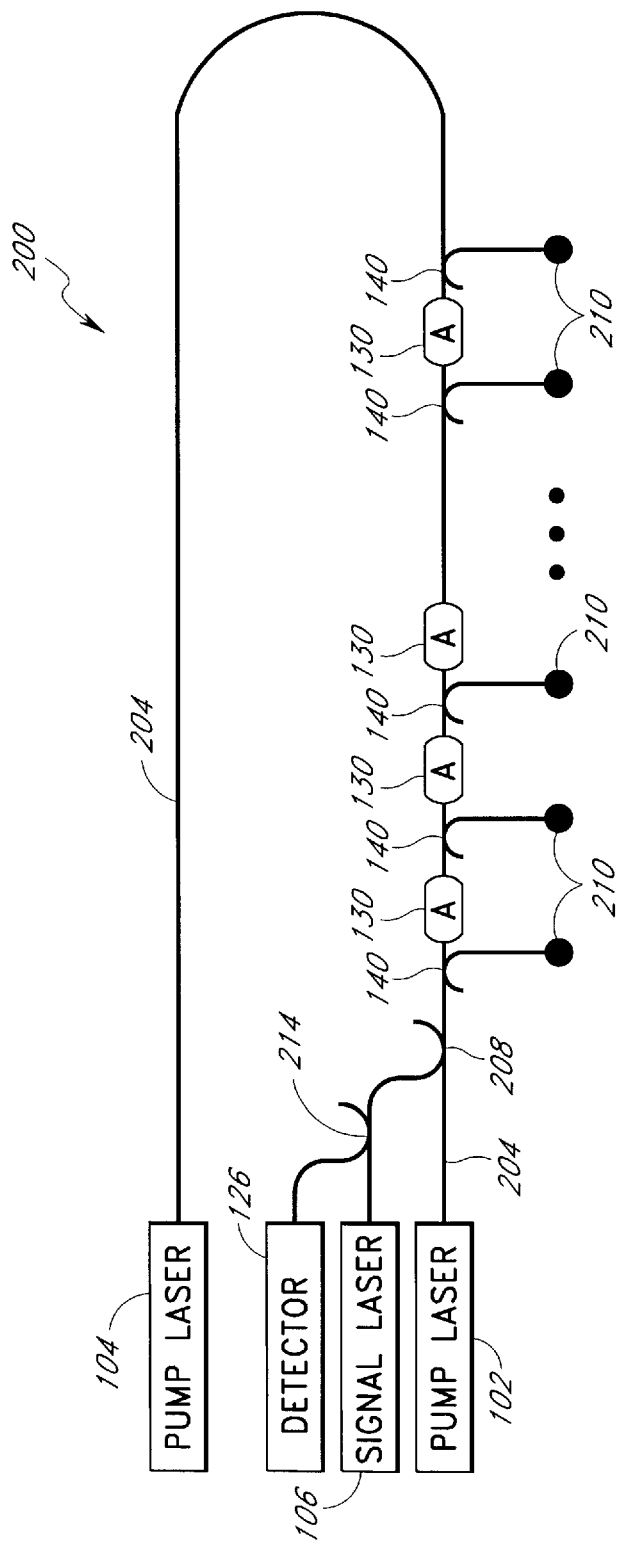
FIG. 9 illustrates an array having bidirectional sensors and a bidirectional bus which functions both as the distribution bus and the return bus.

Although described above in connection with sensor arrays wherein each sensor has an input and an output and wherein the sensor array comprises a distribution bus and a return bus, it should be understood that the sensor can operate with bidirectional sensors and with a bidirectional bus which functions both as the distribution bus and the return bus. Such an array 200 is illustrated in FIG. 9. The array 200 comprises a single optical bus 204 (e.g., an optical fiber) which extends between a pump laser source 102 and a pump laser source 104, as described above in connection with FIG. 2. The outputs of the signal source 106, also described above, and the pump laser source 104 are coupled to the optical bus 204 via a wavelength division multiplexer 208 which is similar to the wavelength division multiplexer 108 in FIG. 2. The detector 126, described above, is also coupled to the optical bus 204 via a coupler 214 and the wavelength division multiplexer 208. Alternatively, the coupler 214 may be replaced by a conventional optical circulator (not shown) which couples the light from the signal laser 106 onto the optical bus 204 via the wavelength division multiplexer 208. The optical circulator also couples light received from the optical bus 204 via the wavelength division multiplexer 208 to the detector 126.

As illustrated in FIG. 9, the optical bus 204 is coupled to a plurality of sensors 210 via a corresponding plurality of the couplers 140. The amplifiers 130 between adjacent couplers operate to amplify the distribution signal, as described above in connection with FIG. 2. Unlike the sensors 110 in the array 12 in FIG. 2, the sensors 210 are bidirectional because they only have a single input/output port. Light which enters the input/output port of a sensor is perturbed by a parameter such as, for example, an acoustic signal, and the light exits by the same input/output port propagating in the opposite direction. The couplers 140 are bidirectional and couple the light from the sensors 210 back to the optical bus 204 but propagating in the opposite direction toward the wavelength division multiplexer 208. The amplifiers 130 are also bidirectional and amplify the return signals in the same manner as the return bus amplifiers 132 in FIG. 2. It can thus be seen that the array 200 in FIG. 9 operates in a similar manner as the array 12 in FIG. 2 but with only a single optical bus 204.

In like manner, the array 14 in FIG. 3 and the array 16 in FIG. 5a can be converted to bidirectional arrays (not shown) using sensors having single input/output ports.

While preferred embodiments of this invention have been disclosed herein, those skilled in the art will appreciate that changes and modifications may be made therein without departing from the spirit and scope of the invention as defined in the appended claims.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

What is claimed is:

1. An optical sensor architecture comprising:

a plurality of sensors which receive an optical signal and which output perturbed optical signals;

a distribution bus coupled to each sensor to distribute the optical signal to each sensor;

a return bus coupled to each sensor to receive the perturbed optical signal from each sensor to be included as a portion of the return signal;

a plurality of first optical amplifiers distributed at selected positions along the length of the distribution bus to maintain the power of the distributed optical signal at a selected level; and a plurality of second optical amplifiers distributed at selected positions along the length of the return bus to maintain the power of the perturbed optical signals in the return signal, wherein a coupling ratio between each optical sensor and the distribution bus is between approximately 0.2 and 0.4.

2. The optical sensor architecture as defined in claim 1, wherein a wavelength division multiplexer is used to couple each sensor to the distribution bus and a wavelength division multiplexer is used to couple each sensor to the return bus.

3. An optical sensor architecture comprising:

a plurality of sensor groups each sensor group comprising at least one sensor which receives an optical signal and which outputs a perturbed optical signal;

a distribution bus coupled to each sensor group to distribute the optical signal to each sensor group;

a return bus coupled to each sensor group to receive the perturbed optical signal from each sensor group;

a plurality of first optical amplifiers distributed at selected positions along the length of the distribution bus to maintain the power of the optical signal at an adequate level for each sensor group; and a plurality of second optical amplifiers distributed at selected positions along the length of the return bus to maintain the power of the perturbed optical signals on the return bus, wherein each optical sensor group comprises at least two optical sensors.

4. An optical sensor architecture comprising:

a plurality of sensor groups each sensor group comprising at least one sensor which receives an optical signal and which outputs a perturbed optical signal;

a distribution bus coupled to each sensor group to distribute the optical signal to each sensor group;

a return bus coupled to each sensor group to receive the perturbed optical signal from each sensor group;

a plurality of first optical amplifiers distributed at selected positions along the length of the distribution bus to maintain the power of the optical signal at an adequate level for each sensor group; and a plurality of second optical amplifiers distributed at selected positions along the length of the return bus to maintain the power of the perturbed optical signals on the return bus, wherein each optical sensor group comprises at least four optical sensors.

5. An optical sensor architecture comprising:

a plurality of sensor groups, each sensor group comprising at least one sensor which receives an optical signal and which outputs a perturbed optical signal;

a distribution bus coupled to each sensor group to distribute the optical signal to each sensor group;

a return bus coupled to each sensor group to receive the perturbed optical signal from each sensor group;

a plurality of first optical amplifiers distributed at selected positions along the length of the distribution bus to maintain the power of the optical signal at an adequate level for each sensor group; and a plurality of second optical amplifiers distributed at selected positions along the length of the return bus to maintain the power of the perturbed optical signals on the return bus, wherein a coupling ratio between the first end of each sensor group and the distribution bus is between approximately 0.4 and 0.95.

6. The optical sensor architecture as defined in claim 5, wherein each sensor group comprises a plurality of sensors coupled between said distribution bus and said return bus, and wherein a number of sensors in each sensor group is selected to provide a maximum signal to noise ratio for said perturbed optical signal.

7. An optical sensor architecture comprising:

a plurality of means for sensing a parameter;

means for distributing a first optical signal to each of said means for sensing;

means for returning a second optical signal from each of said means for sensing;

a plurality of means for amplifying said first optical signal spaced along said means for distributing; and a plurality of means for amplifying said second optical signal spaced along said means for returning, wherein each of said means for sensing comprises a plurality of sensors coupled between said means for distributing and said means for returning, and wherein a number of sensors in each means for sensing is selected to provide a maximum signal to noise ratio for said second optical signal.

8. The optical sensor architecture as defined in claim 7, wherein said parameter is an acoustic input.

9. A method for reducing a noise figure level in a signal returning from a sensor architecture to generate an optical output comprising the steps of:

using a plurality of sensors to generate output signals;

transmitting an optical signal through a distribution bus coupled to each sensor;

coupling the output signal from each sensor into a return signal carried via a return bus coupled to each sensor; and amplifying the optical and return signals at multiple stages along the distribution and the return buses to increase a signal to noise ratio within the sensor architecture, wherein said plurality of sensors are arranged as an array of sub-arrays coupled between said distribution bus and said return bus at each of said multiple stages, and wherein said method further includes the step of selecting an optimum number of sensors for each sub-array.

10. The method as defined in claim 9, wherein the signal to noise ratio is further improved by optimizing a coupling ratio between the each sensor and the distribution bus.

11. The method as defined in claim 10, wherein the signal to noise ratio is further improved by optimizing a coupling ratio between each sensor and the return bus.

12. The method as defined in claim 9, wherein the signal to noise ratio is further improved by optimizing a coupling ratio between each sensor and the return bus.

13. A method for optimizing an array of optical sensors comprising:

providing an array of optical sensors positioned between a distribution fiber which propagates an input optical signal from a source and a return fiber which returns perturbed optical signals to a detector, each optical sensor coupled to said distribution fiber by a respective input coupler and coupled to said return fiber by a respective output coupler;

interposing a plurality of amplifiers at selected locations on said input distribution fiber and said return fiber, said amplifiers compensating for optical signal losses in said sensors, said fibers, and said couplers; and selecting gains for said amplifiers and coupling ratios for said couplers to optimize a system noise figure, said system noise figure being the ratio of a signal to noise ratio of the input optical signal to a signal to noise ratio of an optical signal in a sensor having a lowest signal to noise ratio.

14. The method as defined in claim 13, wherein said array comprises a plurality of sub-arrays coupled between said distribution fiber and said return fiber, and wherein said method further includes the step of selecting an optimum number of sensors for each sub-array.

15. A method for optimizing an array of optical sensors comprising:

providing an array of optical sensors coupled to an optical fiber by a plurality of couplers;

amplifying an optical signal propagating in said optical fiber by a plurality of amplifiers to compensate for losses in said array; and selecting gains for said amplifiers and coupling ratios for said couplers to optimize a system noise figure, said system noise figure being the ratio of a signal to noise ratio of the input optical signal to a signal to noise ratio of an optical signal in a sensor having a lowest signal to noise ratio.

16. An optical sensor architecture comprising:

a plurality of sensors which receive an input optical signal and which output perturbed optical signals in response to a sensed parameter;

at least one optical fiber which distributes an optical signal to each sensor and returns a perturbed optical signal from each sensor; and a plurality of optical amplifiers distributed at selected positions along the length of said at least one optical fiber to maintain the power of the distributed optical signal and returned perturbed optical signals at selected levels.

17. The optical sensor architecture as defined in claim 16, wherein:

said at least one optical fiber comprises a distribution fiber which propagates said input optical signal to said sensors and a return fiber which receives said perturbed optical signals from said sensors; and said plurality of amplifiers comprises a first set of amplifiers in said distribution fiber and a second set of amplifiers in said return fiber.

18. The optical sensor architecture as defined in claim 16, wherein:

said at least one optical fiber propagates said input optical signal to said sensors in a first direction and propagates said perturbed optical signals from said sensors in a second direction opposite said first direction; and said plurality of amplifiers comprises a single set of amplifiers in said at least one optical fiber, said plurality of amplifiers amplifying said input optical signal propagating in said at least one optical fiber in said first direction and amplifying said perturbed optical signals propagating in said at least one optical fiber in said second direction.

* * * * *

UNITED STATES PATENT AND TRADEMARK OFFICE
CERTIFICATE OF CORRECTION

PATENT NO.    : 5,866,898                        Page 1 of 1
DATED         : February 2, 1999
INVENTOR(S)   : Craig W. Hodgson et al.

It is certified that error appears in the above-identified patent and that said Letters Patent is hereby corrected as shown below:

Delete Fig. 5

Signed and Sealed this

Eighteenth Day of December, 2001

*Attest:*

*Attesting Officer*

JAMES E. ROGAN
*Director of the United States Patent and Trademark Office*